United States Patent [19]
Spadaccini et al.

[11] Patent Number: 5,207,053
[45] Date of Patent: May 4, 1993

[54] METHOD AND SYSTEM FOR STAGED RICH/LEAN COMBUSTION

[75] Inventors: Louis J. Spadaccini, Manchester; Thomas J. Rosfjord, South Windsor, both of Conn.

[73] Assignee: United Technologies Corporation, Hartford, Conn.

[21] Appl. No.: 701,424

[22] Filed: May 15, 1991

[51] Int. Cl.[5] .............................. F23R 3/40; F02C 7/12
[52] U.S. Cl. ..................................... 60/39.02; 60/723; 60/732
[58] Field of Search .................. 60/39.02, 39.822, 723, 60/732; 431/7, 170, 328; 123/3

[56] References Cited
U.S. PATENT DOCUMENTS

| | | | |
|---|---|---|---|
| 2,655,786 | 10/1953 | Carr | 60/35.4 |
| 2,951,883 | 9/1960 | Kroeper et al. | |
| 2,979,293 | 4/1961 | Mount | |
| 3,006,142 | 10/1961 | Carr | |
| 3,357,916 | 12/1967 | Smith | 208/120 |
| 3,438,602 | 4/1969 | Noddings et al. | |
| 3,690,100 | 9/1972 | Wolf et al. | 60/206 |
| 3,855,980 | 12/1974 | Weisz et al. | 123/3 |
| 4,185,456 | 1/1980 | Cummings | 60/39.02 |
| 4,273,304 | 6/1981 | Frosch et al. | 244/117 |

OTHER PUBLICATIONS

Dehydrogenation of Hydrocarbons Over a Chromia-Alumina Catalyst in the Absence of Added Hydrogen, by A. W. Ritchie et al., published in I&EC Produce Research and Development, vol. 4, No. 2 (Jun. 1965) at pp. 129-136.
Cooling of Advanced Engines by Endothermic Reactions of Hydrocarbon Fuels, by L. E. Faith, et al., abstracted as Chemical Abstracts 75:14252.
"Endothermic Fuels for Hypersonic Vehicles," by Lander et al., Journal of Aircraft, vol. 8, No. 4, pp. 200-207, 1971.
Carlstrom, L. A. "Improved Emissions Performance in Today's Combustion System." AEG/SOA 7805, Jun. 1978.
Hazard, H. R. "$NO_x$ Emission from Experimental Compact Combustors." ASME 72-GT-105. Mar. 1972.

Primary Examiner—Richard A. Bertsch
Assistant Examiner—Timothy S. Thorpe
Attorney, Agent, or Firm—George J. Romanik

[57] ABSTRACT

A method of combusting an endothermic fuel with staged rich/lean combustion includes transferring thermal energy from a heat source, such as the wall of a rich combustor, to an endothermic fuel decomposition catalyst to cool the heat source and heat the fuel and catalyst to a temperature sufficient to endothermically decompose an endothermic fuel. The catalyst is contacted with the fuel to cause the fuel to decompose into a reaction product stream. The reaction product stream is mixed with a first air stream to form a first fuel/air mixture having an equivalence ratio greater than 1 and the first fuel/air mixture is combusted in a rich combustion stage to produce a combustion product stream. The combustion product stream is mixed with a second air stream to form a second fuel/air mixture having an equivalence ratio less than 1 and the second fuel/air mixture is combusted in a lean combustion stage to produce an exhaust gas stream containing decreased amounts of $NO_x$. The invention also includes a system for practicing the method.

15 Claims, 2 Drawing Sheets

METHOD AND SYSTEM FOR STAGED RICH/LEAN COMBUSTION

CROSS-REFERENCE TO RELATED APPLICATIONS

This application is related to U.S. application Ser. No. 07/701,430, now allowed entitled "Method of Cooling With an Endothermic Fuel", and commonly assigned U.S. application Ser. Nos. 07/701,429now U.S. Pat. No. 5,551,171, entitled "Method of Cooling With an Endothermic Fuel", 07/701,420 entitled "Endothermic Fuel Systems", and 07/701/421 now allowed entitled "Method and System for Lean Premixed/Prevaporized Combustion", all of which are filed on even date herewith.

TECHNICAL FIELD

The present invention is directed to a method and system for reducing $NO_x$ emissions using staged rich-/lean combustion.

BACKGROUND ART

It has long been known that exhaust gases produced by combusting hydrocarbon fuels can contribute to atmospheric pollution. Exhaust gases typically contain pollutants such as nitric oxide (NO) and nitrogen dioxide ($NO_2$), which are frequently grouped together as $NO_x$, unburned hydrocarbons (UHC), carbon monoxide (CO), and particulates, primarily carbon soot. Nitrogen oxides are of particular concern because of their role in forming ground level smog and acid rain and in depleting stratospheric ozone. $NO_x$ may be formed by several mechanisms. First, the high temperature reaction of atmospheric oxygen with atmospheric nitrogen, particularly at adiabatic flame temperatures above about 2800° F., forms "thermal $NO_x$" through the Zeldovich mechanism. Second, the reaction of atmospheric nitrogen with hydrocarbon fuel fragments ($CH_i$), particularly under fuel-rich conditions, forms "prompt $NO_x$". Finally, the reaction of nitrogen released from a nitrogen-containing fuel with atmospheric oxygen, particularly under fuel-lean conditions, forms "fuel-bound $NO_x$". In typical combustors, atmospheric oxygen and nitrogen are readily available in the combustion air which is mixed with the fuel.

Various combustor strategies can be employed to decrease the formation of thermal and fuel-bound $NO_x$. For example, the combustor may be configured to operate uniformly fuel-lean, that is, at equivalence ratios of less than 1.0. The equivalence ratio ($\Phi$) is the ratio of the actual fuel/air ratio to the fuel/air ratio required for stoichiometric combustion. An equivalence ratio of greater than 1.0 indicates fuel-rich conditions, while an equivalence ratio of less than 1.0 indicates fuel-lean conditions. At low equivalence ratios, the adiabatic flame temperatures may be sufficiently low that thermal $NO_x$ does not form in appreciable quantities despite the presence of nitrogen and oxygen. This approach, however, can be limited by combustion stability considerations. Moreover, lean combustion does not reduce the formation of fuel-bound $NO_x$.

An alternative low $NO_x$ combustor configuration uses geometrically or aerodynamically separated rich and lean combustion stages. The fuel is first mixed with air and combusted under fuel-rich conditions. The combustion products from the fuel-rich combustion are then rapidly mixed with additional air and combusted under fuel-lean conditions. This operation is sometimes referred to as rich burn/quick quench/lean burn combustion. The staged rich/lean combustor provides the capability to control both fuel-bound and thermal $NO_x$ emissions without the combustor stability limitations which can accompany uniformly lean combustion. Nitrogen species contained in the fuel are released in the fuel-rich combustion stage and, because of the low oxygen concentration, do not react to form fuel-bound $NO_x$. The fuel-lean combustion stage can be operated at low adiabatic flame temperatures to avoid forming appreciable amounts of thermal $NO_x$. Combustion stability limitations are avoided because the combustion products from the rich stage are very hot, promoting rapid reaction rates in the lean stage and, therefore, stable combustion.

Studies evaluating the potential of staged rich/lean combustion to control $NO_x$ emissions have concluded that $NO_x$ emissions can be minimized by operating the rich combustion stage at a global equivalence ratio ($\Phi_R$) of about 1.5 to about 1.8. The precise value of $\Phi_R$ which yields minimum $NO_x$ may be influenced by combustor residence time, but depends only slightly on fuel type. Optimization of the rich combustion stage may be limited by soot formation, which increases as both the global and local equivalence ratios are increased. Soot is undesirable because it can greatly increase heat transfer to the rich combustor liner and can persist as visible smoke emissions. Experimentally observed trends indicate that over the range $1.0 < \Phi_R < 2.0$, soot production increases continuously, while minimum $NO_x$ production occurs at a finite $\Phi_R$. Therefore, there might be a trade-off between increasing $\Phi_R$ to minimize $NO_x$ emissions and decreasing $\Phi_R$ to limit soot formation. However, equilibrium thermochemical calculations predict that monotonically decreasing $NO_x$ production with soot-free operation at even higher equivalence ratios is possible. Achieving such an operation would require good fuel preparation, especially good fuel-air mixing.

The successful application of staged rich/lean combustion at all equivalence ratios is affected by the degree of fuel preparation, such as atomization and vaporization if the fuel is a liquid, and fuel-air mixing. Up to now, the only methods of preparing the fuel for staged rich/lean combustion have been fuel and air fluid dynamic processes. However, these processes have not been capable of producing the degree of fuel preparation required to achieve the soot-free, monotonically decreasing $NO_x$ production predicted by equilibrium thermochemical calculations.

Another problem encountered with rich/lean combustion is providing adequate cooling for the rich combustor. Conventional air film techniques cannot be used to cool the wall of the rich combustor because the cooling air would lower the equivalence ratio in the rich stage, reducing or eliminating the benefits of rich combustion.

Accordingly, what is needed in the art is a method and system for rich/lean combustion which provides improved fuel preparation and adequate rich combustor cooling.

DISCLOSURE OF THE INVENTION

The present invention is directed to a method and system for rich/lean combustion which provides improved fuel preparation and adequate rich combustor cooling.

One aspect of the invention includes a method of combusting an endothermic fuel in a staged rich/lean combustion system. Thermal energy from a heat source is transferred to an endothermic decomposition catalyst, thereby cooling the heat source and heating the catalyst to a temperature sufficient to endothermically decompose an endothermic fuel. The heated catalyst is contacted with the endothermic fuel stream, thereby causing the fuel stream to endothermically decompose into a reaction product stream. The reaction product stream is mixed with a first air stream to form a first fuel/air mixture having an equivalence ratio greater than 1 and the first fuel/air mixture is combusted in a rich combustion stage, thereby producing a combustion product stream. The combustion product stream is mixed with a second air stream to form a second fuel/air mixture having an equivalence ratio less than 1 and the second fuel/air mixture is combusted in a lean combustion stage, thereby producing an exhaust gas stream containing decreased amounts of $NO_x$.

Another aspect of the invention includes a staged rich/lean combustion system which includes, in combination, an endothermic fuel decomposition catalyst, means for transferring thermal energy from a heat source to the catalyst in order to cool the heat source and heat the catalyst to a temperature sufficient to endothermically decompose an endothermic fuel, means for contacting the heated catalyst with the endothermic fuel stream in order to cause the fuel stream to endothermically decompose into a reaction product stream, means for mixing the reaction product stream with a first air stream to form a first fuel/air mixture having an equivalence ratio of greater than 1, a rich combustion stage for combusting the first fuel/air mixture in order to produce a combustion product stream, means for mixing the combustion product stream with a second air stream to form a second fuel/air mixture having an equivalence ratio of less than 1, and a lean combustion stage for combusting the second fuel/air mixture in order to produce an exhaust gas stream containing decreased amounts of $NO_x$.

The foregoing and other features and advantages of the present invention will become more apparent from the following description and accompanying drawings.

BEST MODE FOR CARRYING OUT THE INVENTION

Figure 1:
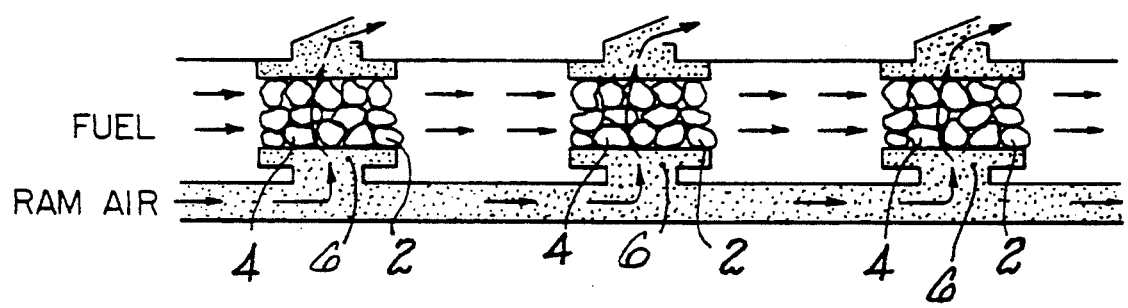
FIGS. 1 and 2 are schematic views of heat exchanger-reactors which may be incorporated in the system of the present invention.

The present invention is compatible with any endothermic fuel capable of undergoing an endothermic decomposition reaction and may be used in conjunction with a wide variety of combustion devices including industrial process heaters, industrial gas turbines, aircraft gas turbines, and advanced aircraft engines such as those contemplated for the high speed civil transport and hypersonic propulsion. An endothermic decomposition reaction is one in which an endothermic fuel is decomposed into reaction products having lower molecular weights than the original endothermic fuel after absorbing a heat of reaction. Typically, endothermic decomposition reactions take place in the gas phase, providing an opportunity to transfer sensible and latent heat to the fuel in addition to a heat of reaction. Common endothermic decomposition reactions include the dehydrogenation of naphthenes to hydrogen and aromatics, the dehydrocyclization of paraffins to hydrogen and aromatics, the dissociation of methanol to hydrogen and carbon monoxide, and the cracking of hydrocarbons to hydrogen and a mixture of saturated and unsaturated hydrocarbons.

Fuels capable of undergoing dehydrogenation or dehydrocyclization reactions include $C_6$ to $C_{20}$ naphthenes, such as methylcyclohexane and cyclohexane, and normal paraffins having up to about 20 carbon atoms. The dehydrogenation or dehydrocyclization of these fuels may be catalyzed by any catalyst which promotes dehydrogenation, dehydrocyclization, or similar reactions. In particular, platinum, rhodium, iridium, palladium, nickel, chromium, cobalt, mixtures thereof, and zeolites supported on alumina or a similar substrate in the form of granules, extrudates, pellets, honeycombs, or any other conventional form have been found to be effective catalysts. Platinum, rhodium, iridium, palladium and mixtures thereof are preferred because of their greater effectiveness in catalyzing dehydrogenation and dehydrocyclization reactions. In order to dehydrogenate or dehydrocyclize at least of portion of the endothermic fuel, the catalyst should be contacted with the fuel at temperatures of about 200° F. to about 1400° F., preferably about 400° F. to about 1000° F., and pressures of about 0.1 atm to about 70 atm.

Fuels capable of undergoing cracking reactions include hydrocarbon fuels such as $C_2$ to $C_{20}$ normal paraffins, $C_3$ to $C_{20}$ isoparaffins, and conventional aircraft turbine fuels. The hydrocarbon fuels may be pure components or mixtures of components and may be distillate fuels having boiling points or ranges between about 200° F. to about 700° F. and specific gravities at 60° F. between about 0.65 and about 0.85. Preferably, the distillate hydrocarbon fuels will have aromatic contents of less than about 25 volume percent and flash points higher than about 100° F. Most preferably, the distillate hydrocarbon fuels will have high paraffin contents and, in particular, high normal paraffin contents. Suitable paraffinic fuels include Norpar TM 12 (Exxon Company, USA, Houston, Tx.), a commercial blend of $C_{10}$ to $C_{13}$ normal paraffins, and Isopar TM H (Exxon), a commercial blend of $C_{11}$ and $C_{12}$ isoparaffins. Suitable conventional aircraft turbine fuels include hydrocarbon fuels which contain paraffins and meet the requirements of the ASTM, IATA, military, or comparable specifications for such fuels or which a person skilled in the art would know to have comparable utility, particularly, but not limited to, those specified or described by ASTM specification D 1655 (Jet A and Jet B), IATA guidelines ADD 76-1 (kerosine and wide-cut), and USAF specifications MIL-T-5624L (JP-4 and JP-5), MIL-T-83133A (JP-8), MIL-T-38219A (JP-7), and MIL-T-25524C (TS).

The cracking reaction contemplated by the present invention is a gas phase surface reaction which produces a variety of products. For example, isoparaffins, normal paraffins, and conventional aircraft turbine fuels crack to a mixture of hydrogen, unsaturated hydrocarbons, such as acetylene, ethylene, propylene, butene, butadiene, pentadiene, pentene, and pentyne, and saturated hydrocarbons, such as methane, ethane, and butane. These products generally have broader flammability limits and are less prone to coking and soot formation than the original liquid fuel, providing operational benefits which are explained below.

Catalysts which have been found to be effective in catalyzing the cracking of hydrocarbons include chromium in the form of chromia; precious metal catalysts such as platinum, rhodium, iridium, ruthenium, palladium, and mixtures thereof; and zeolites. Chromium catalysts used for the present invention should contain about 5 weight percent (wt %) to about 33 wt % chromia, and preferably, about 25 wt % to about 30 wt % chromia. Precious metal catalysts used for the present invention should contain about 0.01 wt % to about 5 wt % precious metal. Preferably, the precious metal catalysts will contain about 0.1 wt % to about 1.0 wt % precious metal, and most preferably, about 0.3 wt % to about 0.5 wt % precious metal. In addition, the precious metal catalysts may contain promoters such as rhenium, as is known in the art. The chromium and precious metal catalysts may be supported on alumina or similar substrates in the form of granules, extrudates, pellets, honeycombs, or any other conventional form. Suitable chromium catalysts include Houdry Type C, a 30 wt % chromia/alumina catalyst which may be purchased from Air Products and Chemicals Company (Allentown, Penna.). Suitable precious metal catalysts include PR-8, a platinum-rhenium on alumina extrudate which may be purchased from American Cyanamid Company (Wayne, N.J.). Other suitable precious metal catalysts may be purchased from Engelhard Corporation (Iselin, N.J.) and UOP (Des Plaines, Ill.). Zeolites are the preferred catalysts for cracking hydrocarbons because they are more reactive and produce more unsaturated products than precious metal catalysts. The zeolites may be faujasites, chabazites, mordenites, silicalites, or any of the other types of zeolite known to catalyze hydrocarbon cracking and should have an effective pore diameter of about 3 Å to about 11 Å. Preferably, the zeolites will have an effective pore diameter of about 4 to about 8 Å. Suitable zeolite catalysts include Octacat, a faujasite which is available from W. R. Grace & Company (Baltimore, Md.), and several catalysts available from UOP (Des Plaines, Ill.) including SAPO-34 which is a chabazite, LZM-8 which is a mordenite, MFI-43, and MFI-47. The zeolites may be supported or stabilized in any suitable manner known in the art. For example, the zeolites may be supported on ceramic granules, extrudates, pellets, monoliths, or even metal foil honeycomb structures. Adhesion between the zeolite and support may be facilitated by mixing the zeolite with about 2 wt % to about 20 wt % of a colloidal material. Suitable colloidal materials include ceria; silica, such as Ludox ™ LS which is available from E. I. DuPont de Nemours & Company (Wilmington, Del.); and organic titanium esters, such as Tyzor ™ which is also available from DuPont.

Methanol is another endothermic fuel useful with the present invention because it has a large heat of vaporization, a high heat capacity, and can be endothermically dissociated to provide a high chemical heat sink and thermally stable products. The endothermic dissociation of methanol into hydrogen and carbon monoxide may be catalyzed by a mixture of about 35 wt % to about 80 wt % copper oxide and about 10 wt % to about 65 wt % zinc oxide. The catalyst may also contain up to about 25 wt % $Al_2O_3$. Suitable catalysts include L-951, a catalyst comprising 42 wt % CuO, 47 wt % ZnO, and 10 wt % $Al_2O_3$ as a stabilizer, which is available from United Catalyst Incorporated (Louisville, Ky.). The CuO-ZnO catalyst may be impregnated with about 0.5 wt % rhodium to increase its reactivity by wetting the catalyst with an aqueous rhodium nitrate solution.

In order to crack or dissociate at least a portion of the endothermic fuel, the catalyst should be contacted with the fuel at a pressure of about 1 atm to about 50 atm, preferably at a pressure above the fuel's critical pressure, and a liquid hourly space velocity (LHSV) of at least about 10 $hr^{-1}$ and especially about 10 $hr^{-1}$ to about 1000 $hr^{-1}$. In particular, the space velocity may range from about 20 $hr^{-1}$ to about 700 $hr^{-1}$. In some subsonic and supersonic aircraft applications, a space velocity between about 150 $hr^{-1}$ and about 250 $hr^{-1}$ would be acceptable. To crack hydrocarbons, the catalyst should be heated to a temperature of about 1000° F. to about 1500° F. and, preferably, about 1200° F. to about 1250° F. in order to achieve high conversions without using excessive temperatures. To dissociate methanol, the catalyst should be heated to a temperature of about 500° F. to about 1200° F. and, preferably, about 800° F. to about 1000° F.

Thermal energy to heat the fuel and catalyst to a temperature sufficient to crack at least a portion of the fuel may come from any heat source which is at a suitable temperature and, preferably, which requires cooling. Suitable heat sources include hot engine components, such as combustion chamber walls, compressor discharge air, combustion chamber liner cooling air, aerodynamic surfaces, avionics, and environmental control systems. Typically, the heat source may be at a temperature of about 1200° F. or higher. Transferring thermal energy from the heat source cools it. The thermal energy from the heat source can also be used to vaporize the fuel and heat it to reaction conditions. The heated fuel may be used to transfer thermal energy from the heat source to the catalyst. The Table summarizes the amount of thermal energy which can be absorbed by several fuels of the present invention. The chemical heat sink is the amount of heat which can be absorbed to initiate the endothermic decomposition. The physical heat sink is the amount of heat which can be absorbed to vaporize and heat the fuel.

TABLE

| Fuel | Heat Sink (Btu/lb) | | |
|---|---|---|---|
| | Chemical | Physical | Total |
| MCH | 894 | 1031 | 1925 |
| Heptane | 1548 | 998 | 2546 |
| Norpor ™ 12 | 1550 | 992 | 2542 |
| Isopar ™ H | 1100 | 981 | 2081 |
| JP-7 | 1100 | 925 | 2025 |

Figure 2:
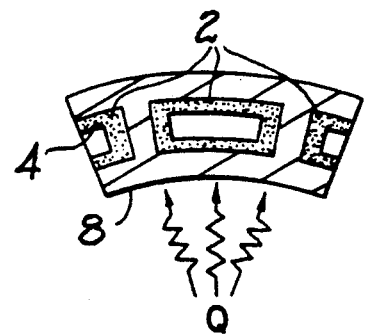

The thermal energy may be transferred to the fuel and catalyst by any conventional heat transfer technique known in the art which permits a desired rich fuel/air mixture to be maintained in the rich combustion stage. Heat transfer may be facilitated by using a heat exchanger-reactor which incorporates the cracking catalyst in a reaction zone and is provided with integral means for transferring thermal energy from the combustion air stream to the catalyst and means for contacting the catalyst with a hydrocarbon fuel. FIG. 1 shows one possible heat exchanger-reactor design in which a plurality of reaction zones 2 containing cracking catalyst 4 are heated by compressor discharge air flowing through a heat exchanger portion 6 without mixing with the fuel. Fuel contacting the heated catalyst cracks into reaction products. The reaction zones 2 may be designed to provide the desired space velocity, pressure drop, and other parameters using conventional catalytic reactor design techniques. The heat exchanger portion 6 may be designed using conventional heat exchanger design techniques. It may be advantageous to construct a heat exchanger reactor which is an integral part of a combustion chamber wall to obtain the thermal energy by direct heat transfer from the combustion chamber. As shown in FIG. 2, a plurality of reaction zones 2 containing a cracking catalyst 4 may be positioned in a combustion chamber wall 8 so that the catalyst 4 is heated by direct heat transfer through the combustion chamber wall 8. This configuration provides the additional benefit of directly cooling the combustion chamber wall without introducing cooling air into the combustion chamber.

Figure 3:
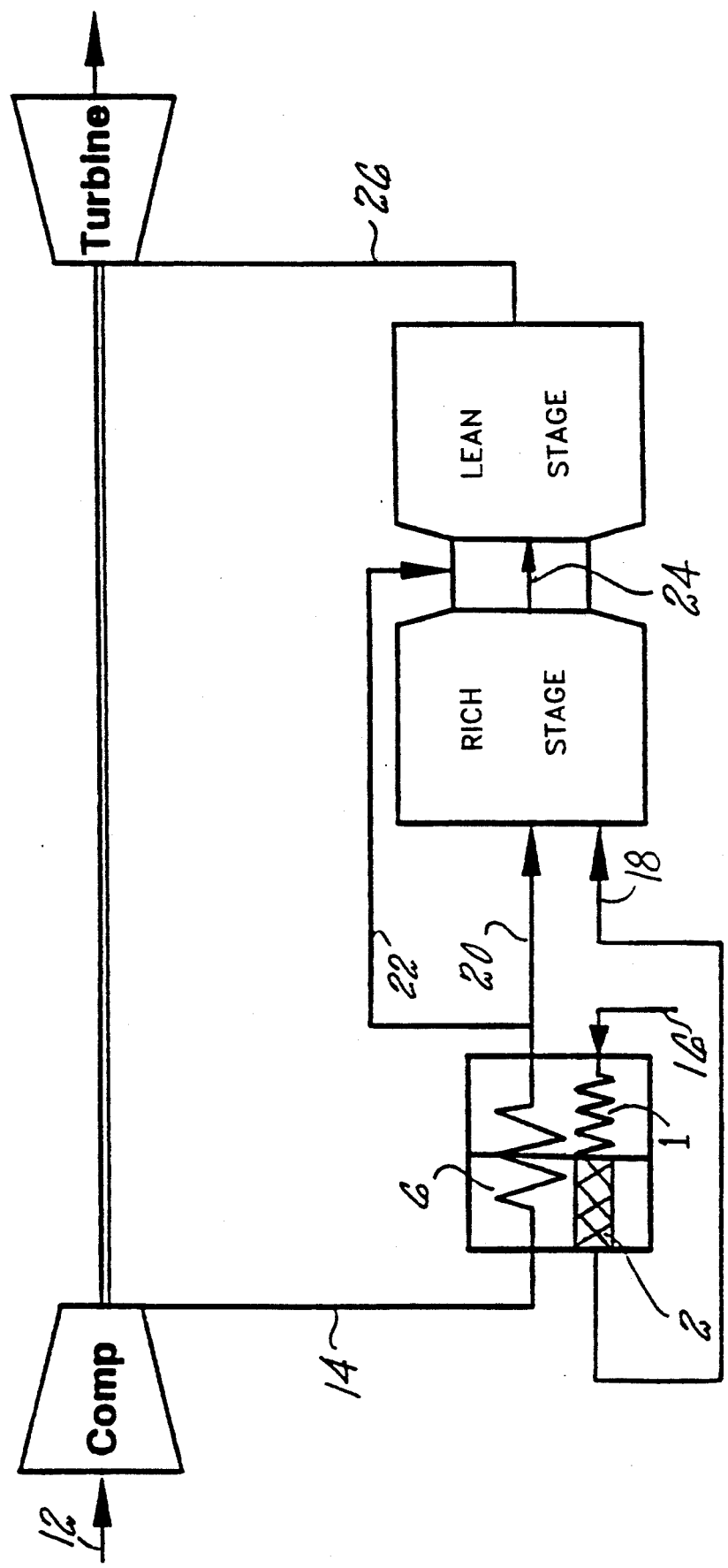
FIG. 3 is a process flow diagram of a typical staged rich/lean combustion system incorporating the present invention.

FIG. 3 shows the process flow for a typical system of the present invention. A combustion air stream 12 is compressed to a suitable temperature and pressure, producing a heated combustion air stream 14. All or a portion of the heated combustion air stream 14 passes through the heat exchanger portion 6 of a heat exchanger-reactor and transfers thermal energy to an endothermic decomposition catalyst 4 in the reaction zone 2 of the heat exchanger-reactor, thereby cooling the combustion air stream 14 and heating the catalyst to a temperature sufficient to endothermically decompose at least a portion of an endothermic fuel stream 16. The fuel stream 16 first passes through a vaporizer 1 where it is vaporized and heated to reaction conditions. It then enters the reaction zone 2 of the heat exchanger-reactor where it contacts the heated catalyst, thereby endothermically decomposing into a reaction product stream 18. The combustion air exiting the heat exchanger portion 6 of the reactor-heat exchanger can be used to cool the exterior of a rich combustion stage before being divided into a first air stream 20 and a second air stream 22. The first air stream 20 is mixed with the reaction product stream 18 to form a first fuel/air mixture having an equivalence ratio greater than 1.0 and is combusted in the rich combustion stage, thereby producing a combustion product stream 24. Preferably, the first fuel/air mixture will have an equivalence ratio of at least about 1.2 and, most preferably, an equivalence ratio of at least about 1.8. The rich combustion stage may be any adequately cooled conventional combustor capable of operating at equivalence ratios of greater than 1.0 with any suitable residence time whose design precludes the introduction of air for internal wall cooling. The combustion product stream 24 is rapidly mixed with the second air stream 22 to form a second fuel/air mixture having an equivalence ratio less than 1.0 and is combusted in a lean combustion stage, thereby producing an exhaust gas stream 26. In order to provide efficient operations in the lean combustion stage, the combustion product stream 24 should be mixed with the second air stream 22 sufficiently fast to preclude the formation of $NO_x$. The mixing may occur in less than about 1 millisecond (msec) and, preferably, in less than about 0.1 msec. Preferably, the second fuel/air mixture will have an equivalence ratio of less than about 0.6 and, most preferably, an equivalence ratio of less than about 0.5. The lean combustion stage may be any conventional combustor capable of operating at equivalence ratios of less than 1.0 with any suitable residence time and may be designed according to conventional techniques. After exiting the lean combustion stage, the exhaust gas stream 26 is expanded across a turbine to produce shaft work to drive the compressor and may then be used to provide propulsion or additional shaft work.

EXAMPLE

A rich/lean combustion system similar to that depicted in FIG. 3 was modelled according to conventional techniques which are known in the art. The engine was operated at a fuel/air ratio of 0.03. Combustion air at 1200° F. and 10 atmospheres (atm) was passed through the heat exchanger portion of a heat exchanger-reactor located in the wall of the rich combustion stage, where it heated a zeolite hydrocarbon cracking catalyst to 1200° F. and was cooled to 1050° F. JP-7 was contacted with the heated catalyst at a liquid hourly space velocity of 150 $hr^{-1}$ and cracked into a reaction product stream comprising hydrogen and a mixture of saturated and unsaturated hydrocarbons. The combustion air exiting the heat exchanger was divided into two streams, 24% to a first air stream and 76% to a second air stream. The first air stream was mixed with the reaction product stream to produce a first fuel/air mixture having an equivalence ratio of 1.8. The first fuel/air mixture was combusted in a rich combustion zone to produce to combustion product stream which was mixed with the second air stream in less than 1 msec to form a second fuel/air mixture having an equivalence ratio of 0.44. The second fuel/air mixture was combusted in a lean combustion stage with a residence time of 2 msec to produce an exhaust gas stream at 2900° F.

The present invention provides several benefits over the prior art. First, endothermically decomposing the fuel prior to combustion produces reaction products which are smaller molecules than the original fuel, are gaseous, and at a high temperature. As a result, the reaction products mix better with the combustion air than the original fuel, permitting a nearly uniform rich fuel/air mixture to be formed. Combusting the reaction products at fuel-rich conditions produces less thermal $NO_x$ and, to the extent possible with the available oxygen, permits a nearly complete reaction to $CO_2$ and $H_2O$ rather than to soot and CO.

Second, cracking hydrocarbon fuels prior to combustion forms primarily hydrogen and low molecular weight saturated and unsaturated hydrocarbons without forming significant amounts of aromatic compounds. The hydrocarbon cracking reaction products tend to produce much less soot than the original fuels, permitting the rich combustion stage to be operated at higher equivalence ratios than would be possible with the original fuel. Combustion at higher equivalence ratios can reduce the formation of fuel-bound $NO_x$ by decreasing the amount of oxygen available to react with nitrogen liberated from the fuel. In addition, decreased soot production decreases radiative heat transfer to combustor walls, permitting the materials used to make the combustor walls to last longer or be replaced with less expensive materials.

Third, the presence of hydrogen in the rich combustion stage as a result of the endothermic decomposition reaction inhibits the formation of prompt $NO_x$ by providing alternate paths for reaction.

Fourth, the use of an endothermic reaction to decompose the fuel prior to combustion provides a heat sink which can be used to cool the rich combustion stage without diluting the rich fuel/air mixture in the stage.

Fifth, because the reaction products tend to produce substantially less coke than the original fuel, the system of the present invention is less prone to being fouled by coke deposits.

It should be understood that the invention is not limited to the particular embodiments shown and described herein, but that various changes and modifications may be made without departing from the spirit or scope of the claimed invention.

We claim:

1. A method of combusting an endothermic fuel in a staged rich/lean combustion system, comprising:
   (a) transferring thermal energy from a heat source to an endothermic fuel decomposition catalyst, wherein the catalyst comprises platinum, rhenium, rhodium, iridium, ruthenium, palladium, mixtures thereof, or a zeolite, thereby cooling the heat source and heating the catalyst to a temperature between about 1000° F. and about 1500° F. to catalytically crack an endothermic fuel stream that comprises a mixture of hydrocarbons having boiling points between about 200° F. to about 700° F. and specific gravities at 60° F. between about 0.65 and about 0.85;
   (b) contacting the heated catalyst with the endothermic fuel stream, thereby causing the fuel stream to catalytically crack into a reaction product stream that comprises hydrogen and unsaturated hydrocarbons to produce a total heat sink of at least about 2025 Btu/lb of fuel;
   (c) mixing the reaction product stream with a first air stream to form a first fuel/air mixture having an equivalence ratio greater than 1;
   (d) combusting the first fuel/air mixture in a rich combustion stage, thereby producing a combustion product stream;
   (e) mixing the combustion product stream with a second air stream to form a second fuel/air mixture having an equivalence ratio less than 1; and
   (f) combusting the second fuel/air mixture in a lean combustion stage, thereby producing an exhaust gas stream containing decreased amounts of $NO_x$.

2. The method of claim 1 further comprising expanding the exhaust gas stream across a turbine, thereby producing power.

3. The method of claim 1 wherein the endothermic fuel comprises hydrocarbons selected from the group consisting of $C_6$ to $C_{20}$ naphthenes, $C_2$ to $C_{20}$ normal paraffins, $C_3$ to $C_{20}$ isoparaffins, and mixtures thereof.

4. The method of claim 1 wherein the first fuel/air mixture has an equivalence ratio of at least about 1.2.

5. The method of claim 1 wherein the combustion product stream is mixed with the second air stream in less than about 1 msec.

6. The method of claim 1 wherein the second fuel/air mixture has an equivalence ratio of less than about 0.6.

7. The method of claim 1 wherein the heat source is selected from the group consisting of hot engine components, compressor discharge air, combustion chamber liner cooling air, aerodynamic surfaces, avionics, and environmental control systems.

8. The method of claim 1 wherein the catalyst comprises a zeolite.

9. The method of claim 1 wherein the first fuel/air mixture has an equivalence ratio of at least about 1.8.

10. The method of claim 1 wherein the second fuel/air mixture has an equivalence ratio of less than about 0.5.

11. A staged/lean combustion system, comprising in combination:
    (a) an endothermic fuel decomposition catalyst capable of catalytically cracking an endothermic fuel stream into a reaction product stream at a temperature between about 1000° F. and about 1500° F. to produce a total heat sink of at least about 2025 Btu/lb of fuel, wherein the catalyst comprises platinum, rhenium, rhodium, iridium, ruthenium, palladium, mixtures thereof, or a zeolite, the endothermic fuel stream comprises a mixture of hydrocarbons having boiling points between about 200° F. to about 700° F. and specific gravities at 60° F. between about 0.65 and about 0.85, and the reaction product stream comprises hydrogen and unsaturated hydrocarbons;
    (b) means for transferring thermal energy from a heat source to the catalyst to cool the heat source and heat the catalyst to a temperature between about 1000° F. and about 1500° F.;
    (c) means for contacting the heated catalyst with the endothermic fuel stream to cause the fuel stream to catalytically crack into the reaction product stream;
    (d) means for mixing the reaction product stream with a first air stream to form a first fuel/air mixture having an equivalence ratio of greater than 1;
    (e) a rich combustion stage for combusting the first fuel/air mixture to produce a combustion product stream;
    (f) means for mixing the combustion product stream with a second air stream to form a second fuel/air mixture having an equivalence ratio of less than 1; and
    (g) a lean combustion stage for combusting the second fuel/air mixture to produce an exhaust gas stream containing decreased amounts of $NO_x$.

12. The system of claim 11 further comprising a turbine for expanding the exhaust gas stream to produce power.

13. The system of claim 11 wherein the endothermic fuel comprises hydrocarbons selected from the group consisting of $C_6$ to $C_{20}$ naphthenes, $C_2$ to $C_{20}$ normal paraffins, $C_3$ to $C_{20}$ isoparaffins, and mixtures thereof.

14. The system of claim 11 wherein the heat source is selected from the group consisting of hot engine components, compressor discharge air, combustion chamber liner cooling air, aerodynamic surfaces, avionics, and environmental control systems.

15. The system of claim 11 wherein the catalyst comprises a zeolite.

* * * * *